UNITED STATES PATENT OFFICE.

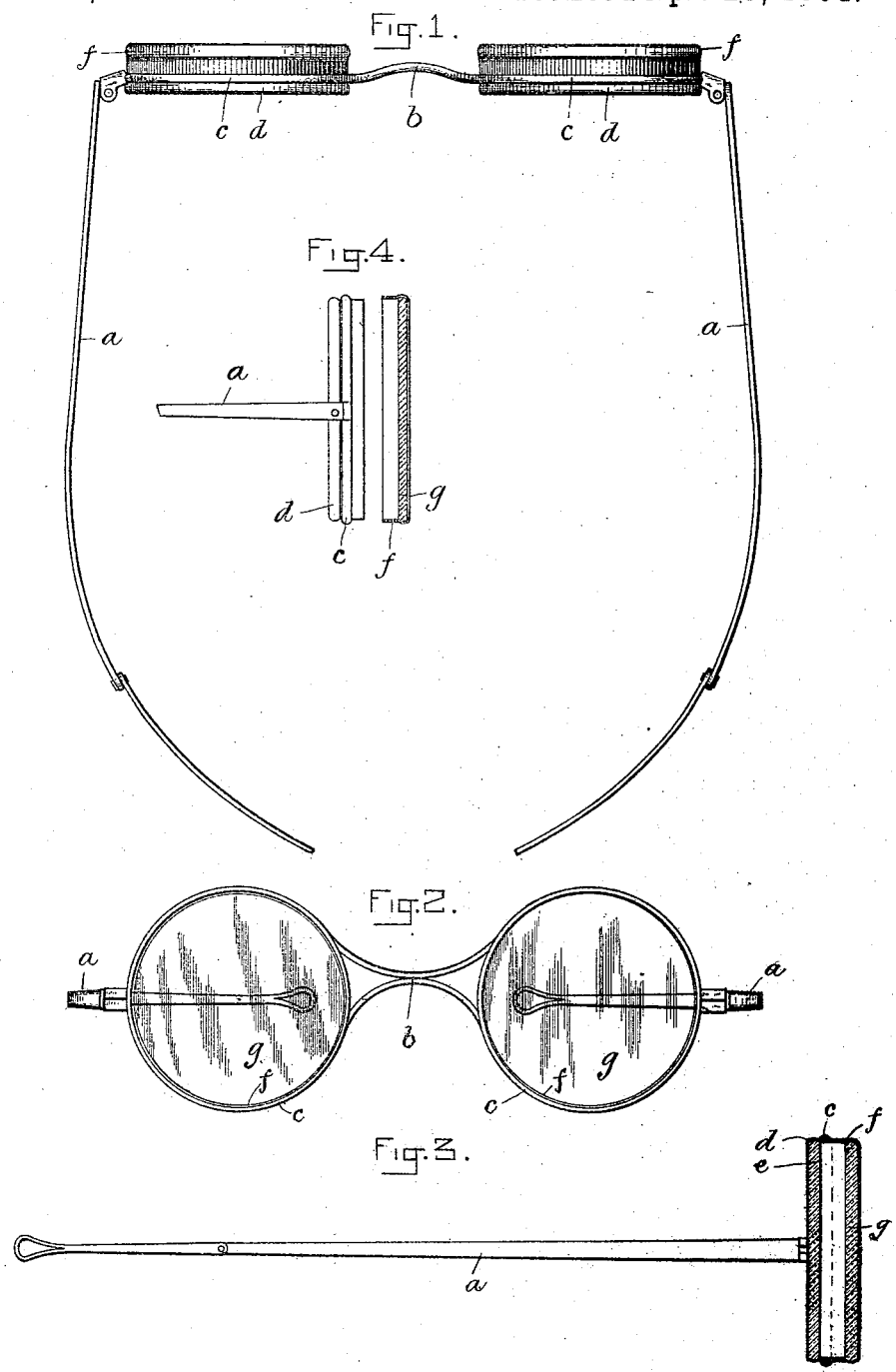

THOMAS L. WILLIAMS, OF WEST QUINCY, MASSACHUSETTS.

STONE-CUTTER'S SPECTACLES.

SPECIFICATION forming part of Letters Patent No. 451,230, dated April 28, 1891.

Application filed September 22, 1890. Serial No. 365,723. (No model.)

*To all whom it may concern:*

Be it known that I, THOMAS L. WILLIAMS, of West Quincy, in the county of Norfolk and State of Massachusetts, have invented certain new and useful Improvements in Stone-Cutters' and Millers' Spectacles, of which the following is a specification.

This invention relates to stone-cutters' or millers' spectacles. In spectacles of this class the outer surface of the glass is liable to become chipped and scarred by the impact thereon of particles of stone, &c., and as it is often necessary, owing to defective vision, for the wearers of these spectacles to use lenses in said spectacles, this scarring or chipping of the outer surface is a matter of some expense and trouble, inasmuch as it necessitates frequent renewal of the lenses.

My invention has for its object to provide a pair of spectacles in which an inner glass or lens is covered or protected by an inexpensive outer cover of glass or other transparent material.

The invention consists in a pair of spectacles of the improved construction, which I will now proceed to describe and claim.

Of the accompanying drawings, forming a part of this specification, Figure 1 represents a top view of a pair of spectacles embodying my improvement. Fig. 2 represents a front view of the same. Fig. 3 represents a vertical section of one of the bows and the frames or holders and glasses therein and a side view of one of the sides or temples. Fig. 4 represents a side view of one of the bows, showing the cap or cover detached therefrom, said cap being shown in section.

The same letters of reference indicate the same parts in all the figures.

In the drawings, *a a* represent the sides or temples, *b* the bridge, and *c c* the bows or eyes, constituting the frame-work of a pair of spectacles. The sides or temples may be of the "turn-pin" form shown in the drawings, or of the form adapted to hook behind the ears of the wearer, and the frame of the spectacles may be of any suitable construction.

In carrying out my invention I provide a frame or holder *d*, adapted to fit tightly in the interior of the bow *c* and project forwardly through the same, as shown most clearly in Fig. 4.

*e* represents the inner glass or lens, which is fitted in the inner end of the frame *d*, as shown in Fig. 3.

*f* represents another frame or holder, constituting a cover or cap fitting over the frame *d*, and adapted to be so held by its connection with the frame *d* that it is in no danger of dropping off while in use, and can yet be removed by the wearer when desired. The connection between the two frames *d* and *f* may be of a frictional character, the frame *f* fitting tightly over the frame *d*, or it may be by means of a slight screw, both frames being provided with a slight thread, or of any other suitable character.

*g* represents an outer guard of glass or any other suitable transparent material, which is set in the cap or cover *f*, as shown in Figs. 3 and 4. It will be seen that the frames *d* and *f* constitute, as it were, a box, of which the flat sides are the glasses *e* and *g*.

The inner glass *e* may be a simple piece of plate or other glass or other suitable transparent material without any lens-power; but if it is necessary for the wearer, by reason of defective vision, to use lenses, the inner glass *e* may be a lens of any desired power. The outer guard *g* may be a piece of cheap glass, or it may be a piece of any other transparent material which may be found suitable for the purpose for which said guard is provided.

The outer frame or cap *f* being removable from the inner frame *d*, it will be seen that when the outer guard *g* has become chipped or scarred, so as to obstruct vision therethrough, it can be readily removed and another cover or guard substituted therefor. By this means it will be seen that the inner and more valuable glass or lens is preserved from harm, while the outer and less expensive glass or cover is rendered easily removable and can be readily replaced at slight cost.

The frame *d*, containing the inner glass or lens *e*, may be permanently affixed to or it may be integral with the bow of the spectacles, or it may be removable therefrom, and various other changes may be made in details without departing from the nature and spirit of my invention.

I claim—

1. Spectacles having inner glasses or lenses, and the outer glasses or transparent guards having inwardly-projecting flanges or holders detachably secured to the holders of the inner glasses, as set forth.

2. Spectacles comprising the frame having the two bows and the single connecting-bridge, the inner glasses or lenses having holders detachably secured to the bows, and the outer glasses or guards having independent holders detachably secured to the holders of the inner glasses, as set forth.

In testimony whereof I have signed my name to this specification, in the presence of two subscribing witnesses, this 19th day of September, A. D. 1890

THOMAS L. WILLIAMS.

Witnesses:
FRED. F. GREEN,
HATTIE L. BURRELL.